United States Patent
Sato

(10) Patent No.: US 7,889,936 B2
(45) Date of Patent: Feb. 15, 2011

(54) IMAGE FORMING APPARATUS AND IMAGE FORMING METHOD

(75) Inventor: Yoshinobu Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/758,446

(22) Filed: Apr. 12, 2010

(65) Prior Publication Data

US 2010/0194913 A1 Aug. 5, 2010

Related U.S. Application Data

(62) Division of application No. 11/231,274, filed on Sep. 20, 2005, now Pat. No. 7,729,547.

(30) Foreign Application Priority Data

Sep. 29, 2004 (JP) ............................. 2004-284340

(51) Int. Cl.
  *G06K 9/36* (2006.01)
  *G06K 9/46* (2006.01)
(52) U.S. Cl. ...................... 382/239; 382/251; 382/296

(58) Field of Classification Search ................. 382/239, 382/251, 296
See application file for complete search history.

(56) References Cited

U.S. PATENT DOCUMENTS

| 5,930,400 | A | | 7/1999 | Kanda et al. |
| 6,052,488 | A | * | 4/2000 | Takahashi et al. ........... 382/239 |
| 7,372,600 | B2 | * | 5/2008 | Kondo .................... 358/426.01 |

FOREIGN PATENT DOCUMENTS

| JP | H08-180194 A | 7/1996 |
| JP | H09-093422 A | 4/1997 |
| JP | H10-336427 A | 12/1998 |

* cited by examiner

*Primary Examiner*—Phuoc Tran
(74) *Attorney, Agent, or Firm*—Canon USA Inc IP Division

(57) ABSTRACT

An image forming apparatus and method capable of decompressing and compressing image data. More specifically, the apparatus and method include decompressing first compressed image data, processing the decompressed image data, selecting from among a plurality of quantization tables a quantization table providing a compression ratio lower than a compression ratio of the first compressed image data, and compressing the processed image data.

3 Claims, 6 Drawing Sheets

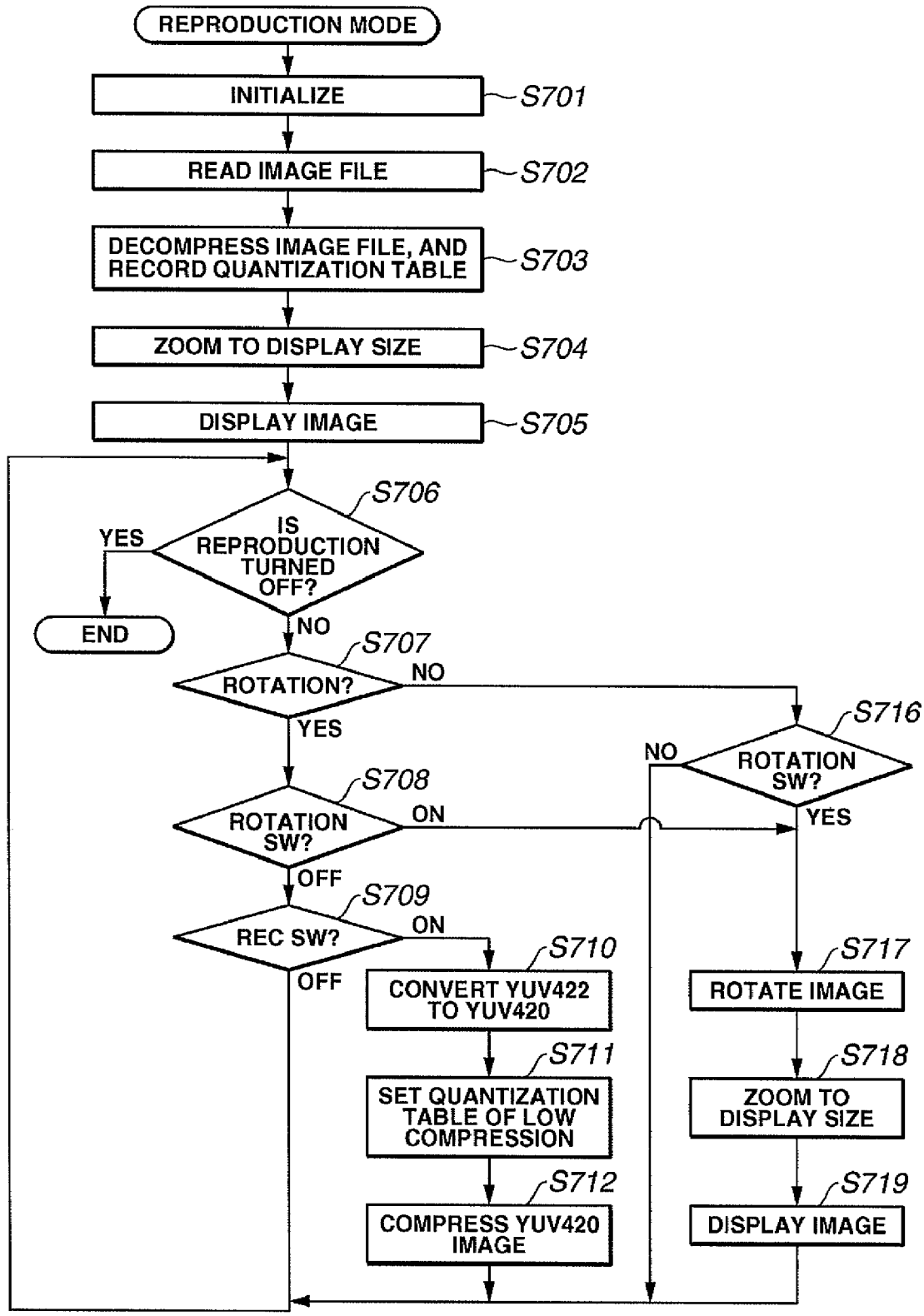

IMAGE FORMING APPARATUS AND IMAGE FORMING METHOD

CROSS-REFERENCE TO RELATED APPLICATIONS

This application is a Divisional of U.S. patent application Ser. No. 11/231,274, filed Sep. 20, 2005, now U.S. Pat. No. 7,729,547, which claims the benefit of Japanese Application No. 2004-284340, filed Sep. 29, 2004, both of which are hereby incorporated by reference herein in their entirety.

BACKGROUND OF THE INVENTION

1. Field of the Invention

The present invention relates to an image forming apparatus and an image forming method that are capable of decompressing and compressing image data.

2. Description of the Related Art

Some conventional image processing apparatuses, such as digital cameras, have a trimming function of cutting a part of an image compressed and recorded in JPEG (Joint Photographic Experts Group) format, and recording the cut image.

In addition, some conventional image processing apparatuses have a function of rotating an image with respect to photographed image data so that the photographed image data can be displayed in a correct orientation according to a posture state taken at the time of photography recorded together with the photographed image data. Furthermore, some conventional image processing apparatuses are capable of applying zoom processing to an image so as to facilitate the entire image to be displayed even after the image is rotated.

In facsimile apparatuses, coding processing is performed by each scanning line in the sub scanning direction of an image for transmission. Accordingly, a high compression ratio can be obtained for an image in which a change in pixel values in the main scanning direction (on the same scanning line) is small as compared to a change in pixel values in the sub scanning direction. However, high compression ratios cannot be obtained for other images.

Therefore, some facsimile apparatuses are configured to apply rotation processing to image data before compression at a predetermined angle in an optional direction, to compare the amount of compressed data before rotation with the amount of compressed data after rotation, and to store the compressed data the amount of which is smaller.

Furthermore, in facsimile apparatuses, at the time of reading a document, the document size and the reading direction are detected by a document sensor and the detected information is stored together with compressed image data of the document into a document storage memory. At the time of transmission, it is determined whether to rotate image data for transmission, based on the performance of a transmission destination receiver and the document size and the reading direction stored in the document storage memory. If a result of determination indicates that the image data should be rotated, the image data is rotated at a predetermined angle before being compressed and transmitted.

In addition, in some printing control apparatuses, when no paper sheet of a predetermined size is available, switching may be made to another paper sheet size to perform printing. In this case, if the orientation of coded image data to be printed is different from the orientation of a designated paper sheet, the coded image data to be printed is decoded first, and the decoded image data is then rotated. After that, the rotated image data is coded again.

In a multifunctional image forming apparatus disclosed in Japanese Patent Application Laid-Open No. 11-112755, the amount of compressed data before rotation and the amount of compressed data after rotation are compared with each other, and the smaller of the two is selected. Accordingly, a reduction in image quality occurs. Therefore, such an apparatus is not suitable for outputting an image to a color printer or displaying an image on a display or the like.

In a color image communication apparatus disclosed in Japanese Patent Application Laid-Open No. 2004-193968, image data before coding and image data decoded after compression and coding are evaluated by an objective evaluation unit. If a result of evaluation indicates a value less than a predetermined level, a coding parameter is changed so as to heighten the quality of the decoded image data. Accordingly, a large computational cost and a long processing time are needed to perform processing. Therefore, such an apparatus is not applicable to a digital camera.

SUMMARY OF THE INVENTION

The present invention has been made in consideration of the above situation, and has a feature to suppress a reduction in image quality which may result from image processing and re-coding when a decoded image is processed and re-coded.

In one aspect of the present invention, an image forming apparatus includes a decompression unit configured to decompress first compressed image data, an image processing unit configured to process image data decompressed by the decompression unit, a plurality of quantization tables, a quantization table selection unit configured to select, from among the plurality of quantization tables, a quantization table providing a compression ratio lower than a compression ratio of the first compressed image data, and a compression unit configured to compress image data obtained by the image processing unit. The compression unit forms image data by compressing an image using the quantization table selected by the quantization table selection unit.

In another aspect of the present invention, an image forming apparatus includes a decompression unit configured to decompress first compressed image data, a quantization table obtaining unit configured to obtain quantization table information of the first compressed image data, a trimming unit configured to trim image data obtained by the decompression unit, and a compression unit configured to compress image data obtained by the trimming unit. The compression unit forms image data by compressing an image using a quantization table obtained by the quantization table obtaining unit.

In a further aspect of the present invention, an image forming apparatus includes a decompression unit configured to decompress first image data compressed in a 422 format of luminance and chrominance signals, a rotation unit configured to rotate image data, a conversion unit configured to convert image data into a 420 format of luminance and chrominance signals, and a compression unit configured to compress image data in the 420 format of luminance and chrominance signals. The rotation unit rotates image data decompressed by the decompression unit. The conversion unit converts image data obtained by the rotation unit into the 420 format of luminance and chrominance signals. The compression unit forms an image by compressing image data obtained by the conversion unit in the 420 format of luminance and chrominance signals.

In a further aspect of the present invention, an image forming apparatus includes an image capture unit having a camera lens configured to capture an image of an object, a signal processing unit configured to process image data captured by the image capture unit, a rotation unit configured to rotate image data processed by the signal processing unit, at least two quantization tables, a quantization table selection unit configured to select one of the at least two quantization tables, and a compression unit configured to compress image data. The at least two quantization tables include a first quantization table providing a first compression ratio, and a second quantization table providing a compression ratio higher than the first compression ratio. The quantization table selection unit selects the second quantization table when the compression unit compresses image data processed by the signal processing unit, and selects the first quantization table when the compression unit compresses image data rotated by the rotation unit. The compression unit forms image data by compressing an image using the quantization table selected by the quantization table selection unit.

In a further aspect of the present invention, an image forming method includes a decompression step of decompressing first compressed image data, an image processing step of processing image data decompressed by the decompression step, a providing step of providing a plurality of quantization tables, a quantization table selection step of selecting, from among the plurality of quantization tables, a quantization table providing a compression ratio lower than a compression ratio of the first compressed image data, and a compression step of compressing image data obtained by the image processing step. Image data is formed by compressing an image in the compression step using the quantization table selected by the quantization table selection step.

In a further aspect of the present invention, an image forming method includes a decompression step of decompressing first compressed image data, a quantization table obtaining step of obtaining quantization table information of the first compressed image data, a trimming step of trimming image data obtained by the decompression step, and a compression step of compressing image data obtained by the trimming step. Image data is formed by compressing an image in the compression step using a quantization table obtained by the quantization table obtaining step.

In a further aspect of the present invention, an image forming method includes a decompression step of decompressing first image data compressed in a 422 format of luminance and chrominance signals, a rotation step of rotating image data, a conversion step of converting image data into a 420 format of luminance and chrominance signals, and a compression step of compressing image data in the 420 format of luminance and chrominance signals. Image data decompressed by the decompression step is rotated in the rotation step. The image data rotated in the rotation step is converted in the conversion step. Then, the image data obtained in the conversion step is compressed in the 420 format of luminance and chrominance signals.

In a further aspect of the present invention, an image forming method includes an image capture step of capturing an image of an object via a camera lens, a signal processing step of processing image data captured by the image capture step, a rotation step of rotating image data processed by the signal processing step, a quantization table selection step of selecting one of at least two quantization tables, and a compression step of compressing image data. The at least two quantization tables include a first quantization table providing a first compression ratio, and a second quantization table providing a compression ratio higher than the first compression ratio. In the quantization table selection step, the second quantization table is selected when image data processed in the signal processing step is compressed, and the first quantization table is selected when image data rotated in the rotation step is compressed. Then, image data is formed by compressing an image in the compression step using the quantization table selected by the quantization table selection step.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a flowchart illustrating a flow according to a seventh embodiment.

DETAILED DESCRIPTION OF THE EMBODIMENTS

Exemplary embodiments of the present invention will be described in detail below with reference to the drawings.

First Embodiment

A first embodiment of the present invention will be described with reference to FIGS. 1 to 3E.

Figure 1:
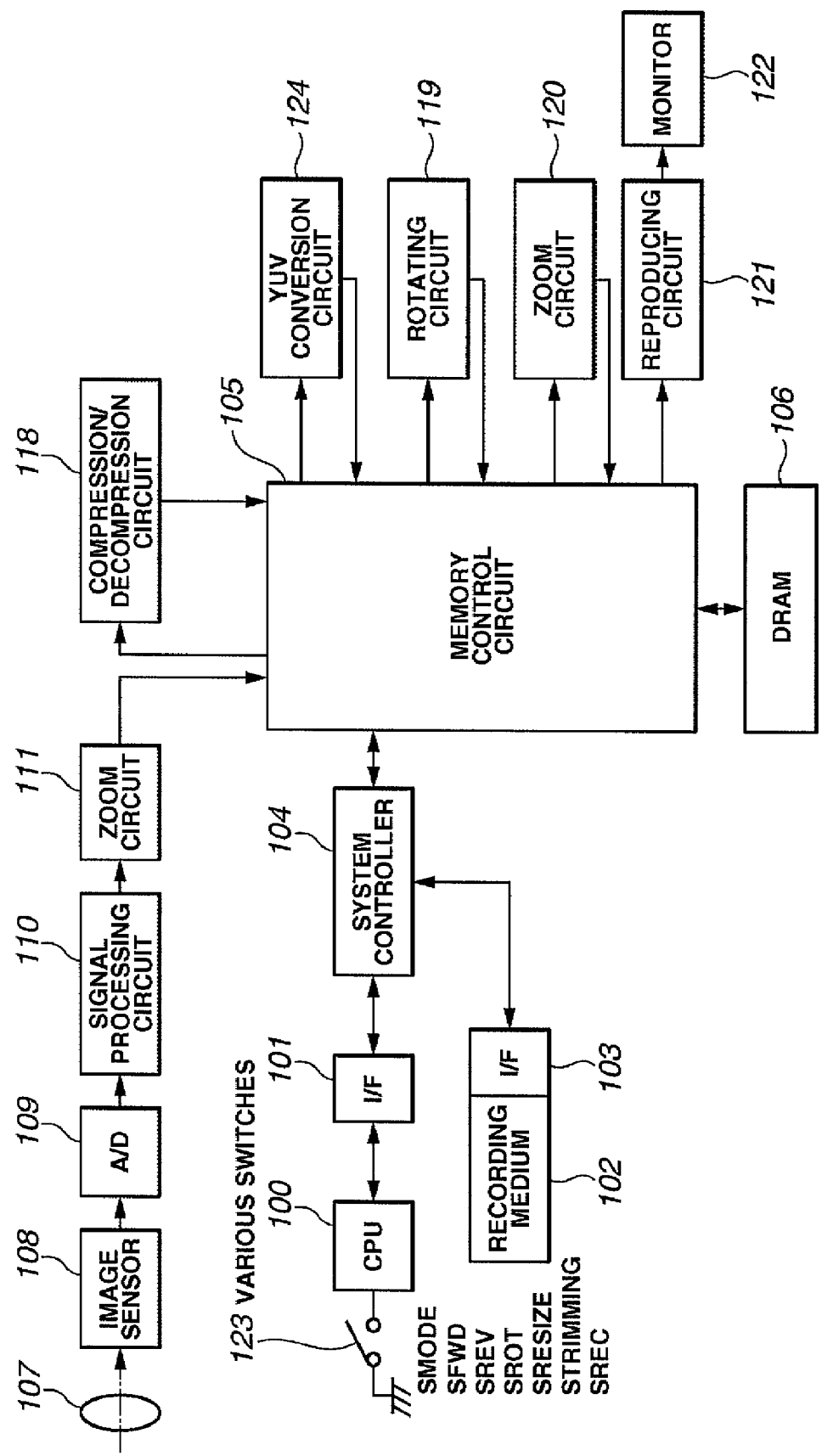
FIG. 1 is a block diagram showing a system configuration according to an embodiment of the present invention.

FIG. 1 is a block diagram showing a system configuration of an image capture apparatus according to the first embodiment. Referring to FIG. 1, reference numeral 100 denotes a central processing unit (CPU) for controlling the entire system. Reference numeral 101 denotes an interface circuit (I/F) for the CPU 100, reference numeral 102 denotes a storage medium such as a memory card, and reference numeral 103 denotes an interface circuit (I/F) for the storage medium 102. Reference numeral 104 denotes a system controller for executing sequential control of the system or control of bus arbitration or the like. Reference numeral 106 denotes a dynamic random access memory (DRAM) for storing image data, a program, or the like. A memory control circuit 105 is a direct memory access controller (DMAC) for DMA-transferring JPEG compressed data stored on the storage medium 102 to the DRAM 106 via the interface circuit 103 and the system controller 104. The memory control circuit 105 further DMA-transfers JPEG compressed data stored in the DRAM 106 to the storage medium 102 via the system controller 104 and the interface circuit 103. In addition, the memory control circuit 105 performs the following operations:

(a) DMA-transfers an output of a zoom circuit 111 (described later) to the DRAM 106.
(b) DMA-transfers data stored in the DRAM 106 to a compression/decompression circuit 118 (described later).
(c) DMA-transfers an output of a YUV conversion circuit 124 (described later) to the DRAM 106.
(d) DMA-transfers an output of the compression/decompression circuit 118 (described later) to the DRAM 106.
(e) DMA-transfers image data stored in the DRAM 106 to a rotating circuit 119 (described later).
(f) DMA-transfers an output of the rotating circuit 119 (described later) to the DRAM 106.
(g) DMA-transfers image data stored in the DRAM 106 to a zoom circuit 120 (described later).
(h) DMA-transfers an output of the zoom circuit 120 (described later) to the DRAM 106.
(i) DMA-transfers image data stored in the DRAM 106 to a reproducing circuit 121 (described later).

Reference numeral 107 denotes an imaging lens, and reference numeral 108 denotes an image sensor which includes a CCD (charge-coupled device) of one-chip configuration. Reference numeral 109 denotes an A/D converter for converting an analog signal into a digital signal. Reference numeral 110 denotes a signal processing circuit, and reference numeral 111 denotes a zoom circuit for reducing image data in horizontal and vertical directions by a well-known technology such as subsampling or linear interpolation. Reference numeral 118 denotes a compressing/decompression circuit for decompressing and restoring image data subjected to block coding and compression coding in the JPEG (Joint Photographic Experts Group) standard.

Reference numeral 124 denotes a YUV conversion circuit for converting YUV422 image data composed of luminance and color signals (described later) into YUV444 image data. In addition, the YUV conversion circuit 124 converts YUV444 image data into YUV422 image data. Furthermore, the YUV conversion circuit 124 converts YUV422 image data into YUV420 image data. These conversions are performed by converting an image format by subjecting chrominance signals to interpolation and subsampling which are well-known technologies.

Reference numeral 119 denotes a rotating circuit for rotating an image during writing or reading in or from the DRAM 106. Reference numeral 120 denotes a zoom circuit for reducing image data in horizontal and vertical directions by subsampling, linear interpolation, and the like. Reference numeral 121 denotes a reproducing circuit for executing modulation, synchronous signal addition, digital-to-analog (D/A) conversion, and the like for image data to generate a video signal. Reference numeral 122 denotes a liquid crystal monitor serving as a display unit. Although, in the above description, the video signal is an analog signal, a digital signal may be used as a video signal. Reference numeral 123 denotes various switches, including a switch SMODE, a switch SFWD, a switch SREV, a switch SROT, a switch SREC, a switch SRESIZE, a switch STRIMMING, and the like.

Next, the various switches 123 connected to the CPU 100 will be described. The switch SMODE is a switch for switching between a photographing mode and a reproduction mode. Each time the switch SMODE is turned on, switching is performed between the photographing mode, in which the image capture apparatus is in a photographing state, and the reproduction mode, in which the image capture apparatus is in a state of displaying an image recorded on the recording medium 102 on the liquid crystal monitor 122. The switch SFWD is a switch for forwarding images to be reproduced by one frame. The switch SREV is a switch for reversing images to be reproduced by one frame. The switch SROT is a switch for rotating an image to be reproduced. Each time the switch SROT is turned on, an image is rotated in order of predetermined angles, e.g., 90°, 270°, and 0°, or 90°, 180°, 270°, and 0°. The switch SRESIZE is a switch for generating an instruction to resize a reproduced image into a predetermined size. When the switch SRESIZE is turned on, resizing is performed. The switch STRIMMING is a switch for generating an instruction to trim a predetermined size from a reproduced image. When the switch STRIMMING is turned on, trimming is performed. The switch SREC is a switch for generating an instruction to record a photographed image when the image capture apparatus is in the photographing mode. Each time the switch SREC is turned on, the photographed image is recorded on the recording medium 102. In addition, when the image capture apparatus is in the reproduction mode, the switch SREC serves as a switch for generating an instruction to record an image subjected to predetermined processing. In this case, when the switch SREC is turned on, the processed image is recorded on the recording medium 102. For example, the predetermined processing includes rotation, resizing, trimming or the like. The first embodiment will be described taking rotation as an example.

FIGS. 3A to 3E are diagrams illustrating relations of images before and after rotation in a case where an image of YUV422 data format is rotated. FIGS. 3A and 3D show relations among pixel data of Y, U, and V in the case of YUV422 data format. FIGS. 3B and 3C show relations among pixel data of Y, U, and V in the case of YUV444 data format. FIG. 3E shows a relation among pixel data of Y, U, and V in the case of YUV420 data format. FIGS. 3A and 3B shows states of images before rotation. FIGS. 3C to 3E show states of images after rotation.

Next, a method for forming images according to the first embodiment will be described with reference to FIGS. 1 and 2. Description will be made of a case of decompressing, rotating and recompressing JPEG compressed data of YUV422 data format, in which Y denotes a luminance signal and U and V denote chrominance signals. The CPU 100 shown in FIG. 1 is set to a reproduction mode when the ON state of the switch SMODE is determined. At the same time, in step S1 shown in FIG. 2, initialization for defining settings required for reproduction and for setting a rotated state is executed. In step S2, a desired compressed image file is read from the recording medium 102 and is then written into the DRAM 106 via the interface circuit 103 and the system controller 104. By this processing, the compressed image file is transferred to the DRAM 106. In step S3, in order to display an image on the monitor 122, the compressed image file stored in the DRAM 106 is supplied to the compression/decompression circuit 118. The compression/decompression circuit 118 decompresses the compressed image file into an image file of YUV422 data format, which is then transferred to the DRAM 106. At the same time, a quantization table is recorded in the DRAM 106. Accordingly, an image of YUV422 data format shown in FIG. 3A is stored in the DRAM 106.

In step S4, the decompressed and restored image data stored in the DRAM 106 is supplied to the zoom circuit 120. At the zoom circuit 120, zooming is executed on the image data to reduce the number of pixels so as to correspond to the liquid crystal monitor 122 from the original image size. The zoomed image data is transferred to the DRAM 106.

In step S5, the image data stored in the DRAM 106 having the number of pixels corresponding to the liquid crystal monitor 122 is supplied to the reproducing circuit 121. Then, the reproduced signal is displayed on the liquid crystal monitor 122.

In step S6, a state of the switch SMODE is determined. If the switch SMODE is determined to be tuned on, the reproduction mode is finished. If the switch SMODE is determined to be in an off-state, the reproduction mode is continued, and the process proceeds to step S7.

In step S7, a rotated state of the image is determined. If a rotated state of 90°, 270°, or 180° of the image is determined, the process proceeds to step S8 so as to determine an image recording instruction. If a rotated state of 0° of the image, i.e., no rotation, is determined, the process proceeds to step S16. Since an initial state is a rotated state of 0° of the image, i.e., no rotation, the process proceeds to step S16.

In step S16, a state of the switch SROT is determined. If the switch SROT is determined to be turned on, the process proceeds to step S26 so as to rotate the image. If the switch SROT is determined to be in an off-state, the process proceeds to step S17. In step S26, rotation processing of the image is performed. In the rotation processing, image data of YUV422 data format is read from the DRAM 106, and is then supplied to the YUV conversion circuit 124. At the YUV conversion circuit 124, the image of YUV422 data format is converted into an image of YUV444 data format (each of chrominance signals U and Y has four pixels with respect to four pixels of a luminance signal Y). Then, the image of YUV444 data format is transferred to the DRAM 106.

Next, the image of YUV444 data format shown in FIG. 3B is read from the DRAM 106, and is then supplied to the rotating circuit 119. At the rotating circuit 119, the image of YUV444 data format is rotated to generate an image of YUV444 data format shown in FIG. 3C. Then, the image rotated by 90° is transferred to the DRAM 106.

Accordingly, the image of the YUV444 data format shown in FIG. 3C is stored in the DRAM 106. Next, the image of YUV444 data format shown in FIG. 3C is read from the DRAM 106, and is then supplied to the YUV conversion circuit 124. At the YUV conversion circuit 124, the image of YUV444 data format is converted into an image of YUV422 data format (each of chrominance signals U and V has one pixel with respect to two pixels of a luminance signal Y) shown in FIG. 3D. Then, the image of YUV422 data format is transferred to the DRAM 106.

Accordingly, the image of YUV422 data format shown in FIG. 3D is stored in the DRAM 106

Returning to FIG. 2, in step S27, the 90°-rotated image data of YUV422 data format stored in the DRAM 106 is supplied to the zoom circuit 120. At the zoom circuit 120, zooming is executed on the image data to reduce the number of pixels so as to correspond to the liquid crystal monitor 122 from the input image size or the image size rotated by 90° from the original image. Then, the zoomed image data is transferred to the DRAM 106.

In step S28, the image data stored in the DRAM 106 having the number of pixels corresponding to the liquid crystal monitor 122 is supplied to the reproducing circuit 121, and the reproduced signal is then displayed on the liquid crystal monitor 122.

Accordingly, a vertically long image rotated by 90° is displayed on the liquid crystal monitor 122.

The case where, after the process proceeds from step S28 to S6, a user turns on the switch SREC to generate an instruction to record the rotated image will now be described.

In step S7, since the rotated state of the image is 90°, the process proceeds to step S8 so as to determine an image recording instruction.

In step S8, a state of the switch SROT is determined, as in step S16. If the switch SROT is determined to be turned on, the process proceeds to step S26 so as to rotate the image as described above. If the switch SROT is determined to be in an off-state, the process proceeds to step S9. In this instance, since the switch SROT is in an off-state, the process proceeds to step S9.

In step S9, a state of the switch SREC is determined. If the switch SREC is determined to be turned on, the process proceeds to step S10 so as to record the rotated image. If the switch SREC is determined to be in an off-state, the process returns to step S6. In this instance, as the switch SREC is turned on, the process proceeds to step S10.

In step S10, a state of the switch SRESIZE is determined. If the switch SRESIZE is determined to be turned on, the process proceeds to step S11 so as to resize the reproduced image to a predetermined size. If the switch SRESIZE is determined to be in an off-state, the process proceeds to step S14. In this instance, as the switch SRESIZE is in an off-state, the process proceeds to step S14.

In step S14, a state of the switch STRIMMING is determined. If the switch STRIMMING is determined to be turned on, the process proceeds to step S15 so as to trim a predetermined size from the reproduced image. If the switch STRIMMING is determined to be in an off-state, the process proceeds to step S12. In this instance, as the switch STRIMMING is in an off-state, the process proceeds to step S12.

In step S12, a quantization table providing a lowest compression ratio is selected and set from among a plurality of quantization tables.

The methods for selecting the quantization table providing a lowest compression ratio include, but are not limited, to the following:
1. A method of selecting a quantization table which is likely to provide a lowest compression ratio among a plurality of quantization tables prepared beforehand.
2. A method of selecting a quantization table having small quantization errors from among quantization tables obtained from inverse quantization tables used during decompression. In other words, a method of selecting a quantization table that is likely to provide a low compression ratio when the same image as that before rotation is coded.
3. A method of repeating recompression to obtain a quantization table providing a low compression ratio.

According to methods 1 and 2, there is no guarantee of a low compression ratio as the rotated image is coded again to be different from the original image. In most cases, however, a compression ratio becomes low, creating no problem in actual use. In the present case, repeated coding is unnecessary, thereby providing an advantage of processability through one pass.

In step S13, the 90°-rotated image data stored in the DRAM 106 is supplied to the compression/decompression circuit 118. At the compression/decompression circuit 118, block coding is executed by using the set quantization table. Then, the compressed JPEG image data is transferred to the DRAM 106.

As described above, according to the image forming method of the first embodiment, the rotated image data is recorded at a low compression ratio.

Thus, in the case of recoding a rotated image, a reduction in image quality which may result from rotation can be suppressed to a relatively low level.

The image forming method of the first embodiment has been described taking as an example a case where the rotated image data is recorded responsive to the user's instruction. However, the image forming method can be similarly implemented in the case of transferring a JPEG file to a printer connected to a digital camera.

Furthermore, while, in the first embodiment, each processing is carried out by hardware, the processing can be carried out by software.

Second Embodiment

Figure 4:
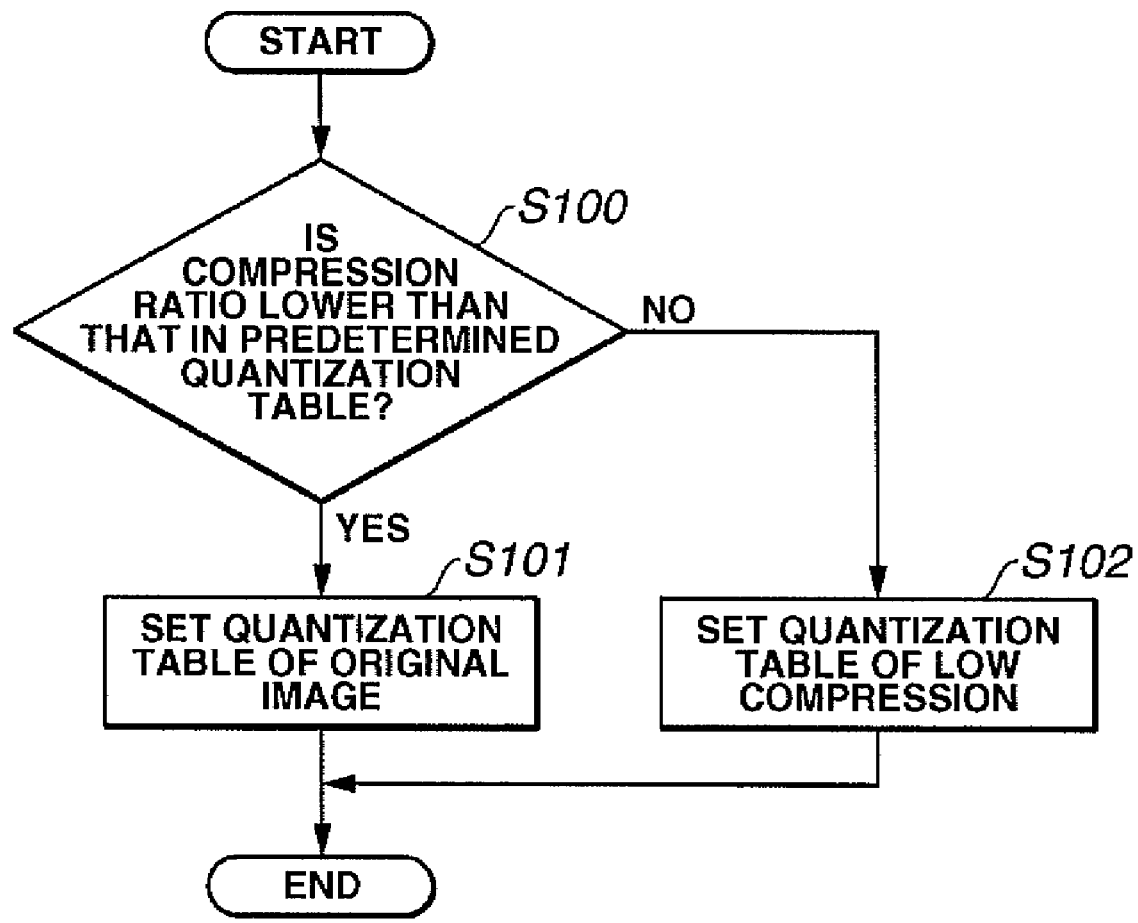
FIG. 4 is a flowchart illustrating a flow according to a second embodiment.

Next, a second embodiment of the present invention will be described with reference to FIG. 4.

Figure 2:
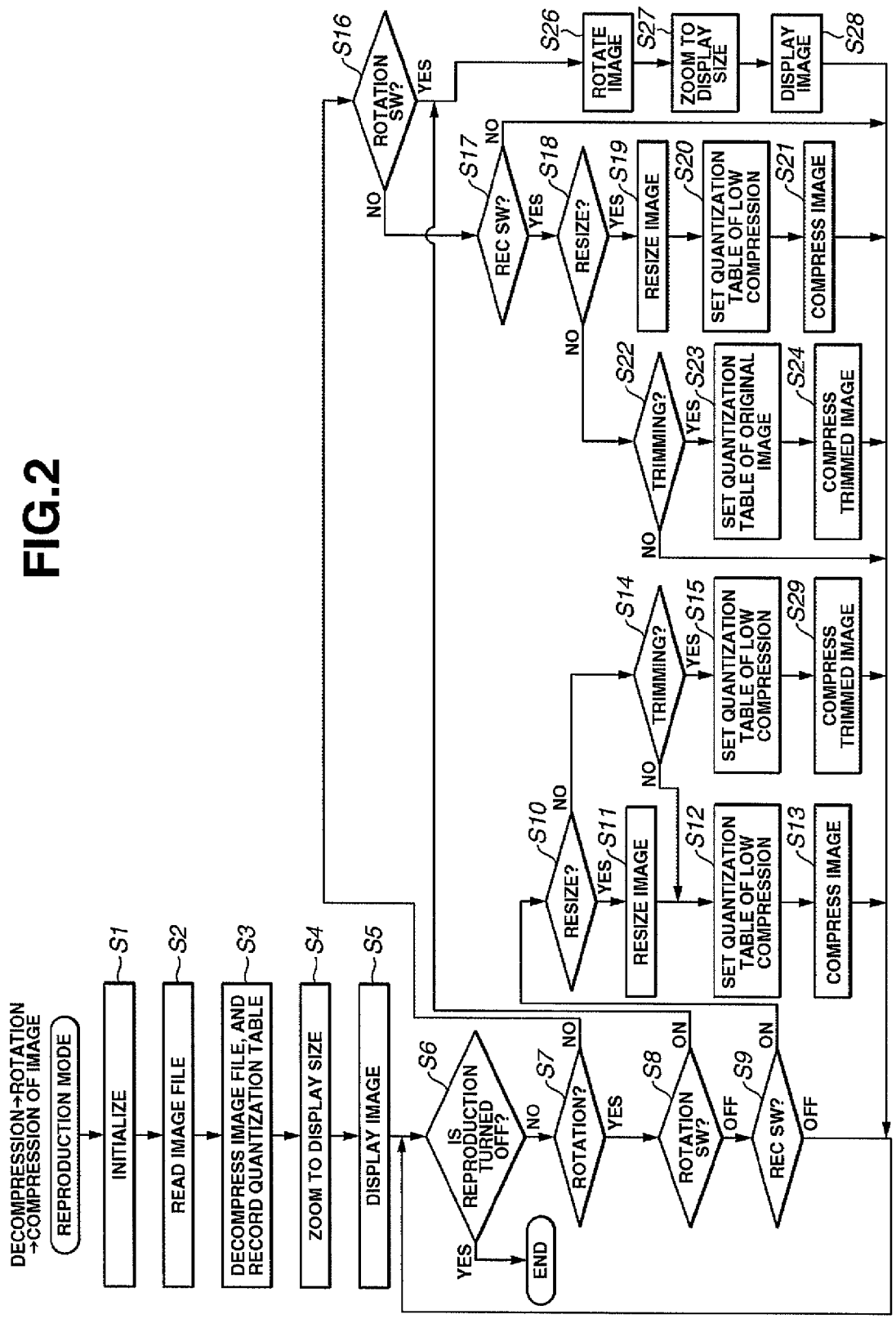
FIG. 2 is a flowchart illustrating a flow according to a first embodiment.

A basic system configuration of an image forming method of the second embodiment is similar to that of the first embodiment shown in FIGS. 1 and 2, and therefore, the description of the second embodiment includes references to these figures.

The second embodiment is applied to a digital camera having the function of rotating and recompressing a reproduced image.

The image forming method of the second embodiment will be described below in detail.

A case of rotating JPEG-compressed data of YUV422 data format will be described.

A difference from the first embodiment is the method of setting a quantization table providing a low compression ratio in step S12 of FIG. 2.

The detail of step S12 in the present embodiment is described with reference to FIG. 4.

In step S100, a quantization table providing a lowest compression ratio among a plurality of quantization tables is compared with a quantization table recorded in step S3 of FIG. 2. If a compression ratio provided by the quantization table recorded in step S3 is determined to be lower than the lowest compression ratio, the process proceeds to step S101. If the compression ratio of the quantization table recorded in step S3 is determined to be equal to or greater than the lowest compression ratio, the process proceeds to step S102.

In step S101, the quantization table recorded in step S3, which is a quantization table used for the original image, is set.

In step S102, the quantization table providing a lowest compression ratio is set.

As described above, according to the image forming method of the second embodiment, a quantization table providing a lower compression ratio is selected from a quantization table used during decompression and a predetermined quantization table, and a rotated image is recorded at the lower compression ratio.

Thus, in the case of recording a rotated image, a reduction in image quality which may result from rotation can be suppressed to a relatively low level.

The image forming method of the second embodiment has been described taking as an example a case where the rotated image data is recorded responsive to the user's instruction. However, the image forming method can be similarly implemented in the case of transferring a JPEG file to a printer connected to a digital camera.

Furthermore, while, as in the first embodiment, each processing is carried out by hardware, the processing can also be carried out by software.

Third Embodiment

Next, a third embodiment of the present invention will be described.

A basic system configuration of an image forming method of the third embodiment is similar to that of the first embodiment shown in FIGS. 1 and 2, and therefore, the description of the third embodiment includes references to these figures.

According to the third embodiment, the image forming method is applied to a digital camera which has the function of resizing and recompressing a reproduced image.

The image forming method of the third embodiment will be described below in detail.

A case of resizing JPEG-compressed data of YUV422 data format will be described.

As in the first embodiment, the process proceeds from step S1 through step S7, in which image data stored in the DRAM 106 having the number of pixels corresponding to the liquid crystal monitor 122 is supplied to the reproducing circuit 121. The reproduced image is then displayed on the liquid crystal monitor 122.

In step S7, a rotated state of the image is determined. Since an initial state is a rotation of 0° of the image, i.e., a nonrotated state, the process proceeds to step S16.

In step S16, a state of the switch SROT is determined. If the switch SROT is determined to be in an off-state, the process proceeds to step S17.

In step S17, a state of the switch SREC is determined. If the switch SREC is determined to be turned on, the process proceeds to step S18 so as to record the rotated image. If the switch SREC is determined to be in an off-state, the process proceeds to step S6. In this instance, as the switch SREC is turned on, the process proceeds to step S18.

In step S18, a state of the switch SRESIZE is determined. If the switch RESIZE is determined to be turned on, the process proceeds to step S19 so as to resize the reproduced image to a predetermined size. If the switch SRESIZE is determined to be in an off-state, the process proceeds to step S22. In this instance, as the switch SRESIZE is turned on, the process proceeds to step S19.

In step S19, decompressed and restored image data stored in the DRAM 106 is supplied to the zoom circuit 120. At the zoom circuit 120, zooming is executed from the size of the input image to a predetermined size. Then, the image resized to the predetermined size is transferred to the DRAM 106.

In step S20, a quantization table providing a lowest compression ratio is selected and set from among a plurality of quantization tables.

In step S21, the image data resized to the predetermined size stored in the DRAM 106 is supplied to the compression/decompression circuit 118. At the compression/decompression circuit 118, block coding is executed by using the set quantization table. The compressed JPEG image data is transferred to the DRAM 106 and is then recorded on the recording medium 102.

As described above, according to the image forming method of the third embodiment, the image data resized to the predetermine size is recorded at a low compression ratio.

Thus, in the case of recording a resized image, a reduction in image quality which may result from resizing can be suppressed to a relatively small level.

The image forming method of the third embodiment has been described taking as an example a case where the resized image data is recorded responsive to the user's instruction. However, the image forming method can be similarly implemented in the case of transferring a JPEG file to a printer connected to a digital camera.

As in the second embodiment, a quantization table providing a lower compression ratio is selected from a quantization table used during decompression and a predetermined quantization table, and a resized image is recorded at the lower compression ratio.

Furthermore, while, in the third embodiment, each processing is carried out by hardware, the processing can be carried out by software.

Fourth Embodiment

Next, a fourth embodiment of the present invention will be described.

A basic system configuration of an image forming method of the fourth embodiment is similar to that of the third embodiment shown in FIGS. 1 and 2, and therefore, the description of the fourth embodiment includes references to these figures.

According to the fourth embodiment, the image forming method is applied to a digital camera which has the function of trimming and recompressing a reproduced image. The image forming method of the fourth embodiment will be described in detail.

A case of trimming JPEG-compressed data of YUV422 data format will be described.

As in the first embodiment, the process proceeds from step S1 through step S7, in which image data stored in the DRAM 106 having the number of pixels corresponding to the liquid crystal monitor 122 is supplied to the reproducing circuit 121. The reproduced image is then displayed on the liquid crystal monitor 122.

In step S7, a rotated state of the image is determined. Since an initial state is a rotation of 0° of the image, i.e., a nonrotated state, the process proceeds to step S16.

In step S16, a state of the switch SROT is determined. If the switch SROT is determined to be in an off-state, the process proceeds to step S17.

In step S17, a state of the switch SREC is determined. If the switch SREC is determined to be turned on, the process proceeds to step S18 so as to record the rotated image. If the switch SREC is determined to be in an off-state, the process proceeds to step S6. In this instance, as the switch SREC is turned on, the process proceeds to step S18.

In step S18, a state of the switch SRESIZE is determined. If the switch RESIZE is determined to be turned on, the process proceeds to step S19 so as to resize the reproduced image to a predetermined size. If the switch SRESIZE is determined to be in an off-state, the process proceeds to step S22. In this instance, as the switch SRESIZE is in an off-state, the process proceeds to step S22.

In step S22, a state of the switch STRIMMING is determined. If the switch STRIMMING is determined to be turned on, the process proceeds to step S23 so as to trim a predetermined size from the reproduced image. If the switch STRIMMING is determined to be in an off-state, the process proceeds to step S6. In this instance, as the switch STRIMMING is turned on, the process proceeds to step S23.

In step S23, a quantization table recorded in step S3 is set.

In step S24, image data of a predetermined size obtained by trimming decompressed and restored image data stored in the DRAM 106 is supplied to the compression/decompression circuit 118. At the compression/decompression circuit 118, block coding is executed by using the set quantization table. The compressed JPEG image data is then transferred to the DRAM 106.

As described above, according to the image forming method of the fourth embodiment, the image data trimmed to the predetermined size is recorded at a compression ratio equal to that of a decompressed image.

Thus, in the case of recording a trimmed image, a compression operation providing image quality equal to that of the decompressed image can be performed without any image quality reduction.

The image forming method of the fourth embodiment has been described taking as an example a case where the trimmed image data is recorded responsive to the user's instruction. However, the image forming method can be similarly implemented in the case of transferring a JPEG file to a printer connected to a digital camera.

Furthermore, while, in the fourth embodiment, each processing is carried out by hardware, the processing can be carried out by software.

Fifth Embodiment

Next, a fifth embodiment of the present invention will be described.

A basic system configuration of an image forming method of the fifth embodiment is similar to those of the first and fourth embodiments shown in FIGS. 1 and 2, and therefore, the description of the fifth embodiment includes references to these figures.

According to the fifth embodiment, the image forming method is applied to a digital camera which has functions of rotating, trimming, and recompressing a reproduced image. The image forming method of the fifth embodiment will be described in detail.

A case of rotating and trimming JPEG-compressed data of YUV422 data format will be described.

As in the first embodiment, the process proceeds from step S1 through step S7, in which image data stored in the DRAM 106 having the number of pixels corresponding to the liquid crystal monitor 122 is supplied to the reproducing circuit 121. The reproduced image is then displayed on the liquid crystal monitor 122.

In step S7, a rotated state of the image is determined. Since an initial state is a rotation of 0° of the image, i.e., a nonrotated state, the process proceeds to step S16.

In step S16, a state of the switch SROT is determined. If the switch SROT is determined to be turned on, the process proceeds to step S26.

In step S26, decompressed and restored image data stored in the DRAM 106 is read out and rotated by 90°. The image data rotated by 90° is then transferred to the DRAM 106.

In step S27, the 90°-rotated image data stored in the DRAM 106 is supplied to the zoom circuit 120. At the zoom circuit 120, zooming is executed from a 90°-rotated image size of the original image to the number of pixels corresponding to the liquid crystal monitor 122. Then, the image data having the number of pixels corresponding to the liquid crystal monitor 122 is transferred to the DRAM 106.

In step S28, the image data stored in the DRAM 106 having the number of pixels corresponding to the liquid crystal monitor 122 is supplied to the reproducing circuit 121. The reproduced image is then displayed on the liquid crystal monitor 122.

Accordingly, a vertically long image rotated by 90° (not shown) is displayed on the liquid crystal monitor 122.

Now, a description will be made of a case where the process proceeds from step S28 through step S7 and a user turns on the switch STRIMMING to generate an instruction to trim the rotated image.

In step S7, as the rotated state of the image is 90°, the process proceeds to step S8 so as to determine an image recording instruction.

In step S8, a state of the switch SROT is determined. If the switch SROT is determined to be turned on, the process proceeds to step S26 to rotate the image. If the switch SROT is determined to be in an off-state, the process proceeds to step S9. In this instance, as the switch SROT is in an off-state, the process proceeds to step S9.

In step S9, a state of the switch SREC is determined. If the switch SREC is determined to be turned on, the process proceeds to step S10 so as to record the rotated image. If the switch SREC is determined to be in an off-state, the process proceeds to step S6. In this instance, as the switch SREC is turned on, the process proceeds to step S10.

In step S10, a state of the switch SRESIZE is determined. If the switch RESIZE is determined to be turned on, the process proceeds to step S11 so as to resize the reproduced image to a predetermined size. If the switch SRESIZE is determined to be in an off-state, the process proceeds to step S14. In this instance, as the switch SRESIZE is in an off-state, the process proceeds to step S14.

In step S14, a state of the switch STRIMMING is determined. If the switch STRIMMING is determined to be turned on, the process proceeds to step S15 so as to trim a predetermined size from the reproduced image. If the switch STRIMMING is determined to be in an off-state, the process proceeds to step S12. In this instance, as the switch STRIMMING is turned on, the process proceeds to step S15.

In step S15, a quantization table providing a lowest compression ratio is selected and set from among a plurality of quantization tables.

In step S29, image data of a predetermined size obtained by trimming the 90°-rotated image data stored in the DRAM 106 is supplied to the compression/decompression circuit 118. At the compression/decompression circuit 118, block coding is executed based on the set quantization table. The compressed JPEG image data is transferred to the DRAM 106 and is then recorded on the recording medium 102.

As described above, according to the image forming method of the fifth embodiment, the image data trimmed to the predetermine size from the 90°-rotated image data is recorded at a low compression ratio.

Thus, in the case of recording a rotated and trimmed image, a reduction in image quality which may result from rotation and trimming can be suppressed to a relatively small level.

The image forming method of the fifth embodiment has been described taking an example a case where the rotated and trimmed image data is recorded responsive to the user's instruction. However, the image forming method can be similarly implemented in the case of transferring a JPEG file to a printer connected to a digital camera.

As in the second embodiment, a quantization table providing a lower compression ratio is selected from a quantization table used during decompression and a predetermined quantization table, and a resized image is recorded at the lower compression ratio.

Furthermore, while, in the fifth embodiment, each processing is carried out by hardware, the processing can be carried out by software.

Sixth Embodiment

Figure 5:
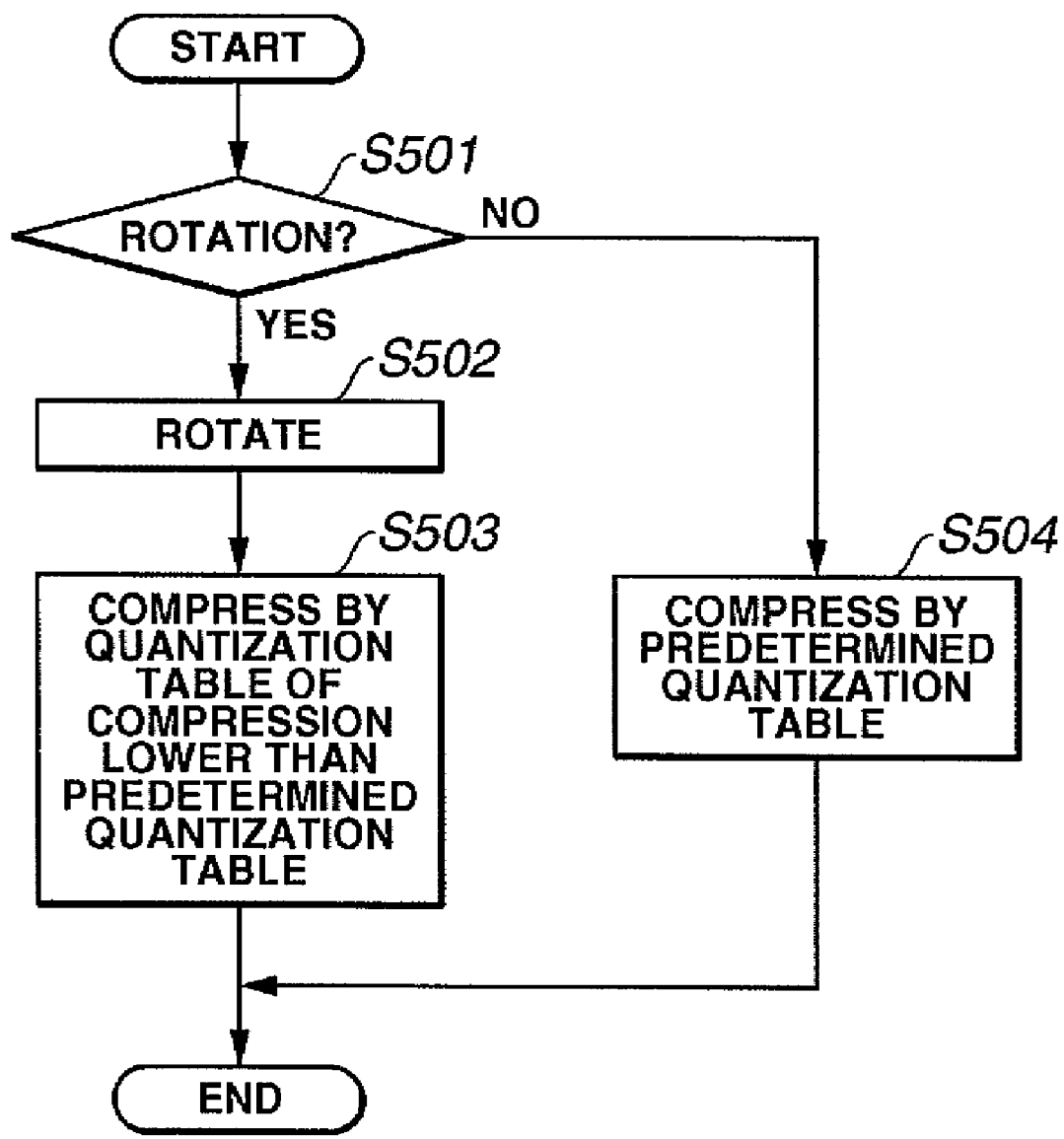
FIG. 5 is a flowchart illustrating a flow according to a sixth embodiment.

Next, a sixth embodiment of the present invention will be described with reference to FIG. 5.

A basic system configuration of an image forming method of the sixth embodiment is similar to that of the first embodiment shown in FIG. 1, and therefore, the description of the sixth embodiment includes references to FIG. 1.

The image forming method of the sixth embodiment is applied to a digital camera which has the function of automatically rotating a photographed image. The image forming method of the sixth embodiment will be described in detail.

When determining an on-state of the switch SMODE, the CPU 100 enters a photographing mode and determines the state of the switch SREC. If the switch SREC is determined to be turned on, the CPU 100 starts a photographing operation.

The image sensor 108 is arranged on an optical axis of the imaging lens 107. An image of an object (not shown) is formed on an imaging plane of the image sensor 108 by the imaging lens 107.

An object image formed on the imaging plane of the image sensor 108 is subjected to photoelectric conversion by the image sensor 108 to be sequentially read out as CCD signals. The CCD signals are converted from an analog signal into a digital signal by the A/D converter 109. The digital image signal is supplied to the signal processing circuit 110. The signal processing circuit 110 includes a white balance adjusting circuit, a gamma correction circuit, and a YC processing circuit. Image data of YUV422 data format obtained by the signal processing circuit 110 is supplied to the zoom circuit 111. The zoom circuit 111 reduces the image data in horizontal and vertical directions by performing subsampling, linear interpolation, and the like on the image data according to a recording size, and outputs the reduced image data to the memory control circuit 105. The memory control circuit 105 writes the image data into the DRAM 106. Thus, the photographed image data is transferred to the DRAM 106.

Accordingly, an image of YUV422 data format shown in FIG. 3A is formed in the DRAM 106.

Next, compression coding processing will be described with reference to a flowchart of FIG. 5.

In step S501, a state of the imaging lens 107 (i.e., an orientation of the digital camera) is determined. If the imaging lens 107 is determined to be in a rotated state of 90° or 270°, the process proceeds to step S502 so as to generate an instruction to rotate an image.

If the imaging lens 107 is determined to be in a rotated state of 0°, i.e., a nonrotated state, the process proceeds to step S504.

In this instance, as the imaging lens 107 is determined to be in a rotated state of 90°, the process proceeds to step S502.

In step S502, an image of YUV422 data format stored in the DRAM 106 shown in FIG. 3A is read out and supplied to the YUV conversion circuit 124. At the YUV conversion circuit 124, the input image of YUV422 data format is converted into an image of YUV444 data format. The image of YUV444 data format is then transferred to the DRAM 106.

Thus, the image of YUV444 data format shown in FIG. 3B is stored in the DRAM 106.

Further, the image of YUV444 data format shown in FIG. 3B is read out from the DRAM 106 and is then supplied to the rotating circuit 119. At the rotating circuit 119, an image is rotated, and the image rotated by 90° is transferred to the DRAM 106.

Thus, the image of YUV444 data format shown in FIG. 3C is stored in the DRAM 106.

The image of YUV444 data format shown in FIG. 3C is read out from the DRAM 106 and is then supplied to the YUV conversion circuit 124. At the YUV conversion circuit 124, the input image of YUV444 data format is converted into an image of YUV422 data format. The image of YUV422 data format is transferred to the DRAM 106.

Thus, the image of YUV422 data format shown in FIG. 3D is stored in the DRAM 106.

In step S503, a quantization table for compressing and coding data is set in the compression/decompression circuit 118 so as to provide a compression ratio lower than a compression ratio provided by a predetermined quantization table. Then, the image data rotated by 90° stored in the DRAM 106 is supplied to the compression/decompression circuit 118. At the compression/decompression circuit 118, block coding is executed based on the set quantization table, so that a compressed JPEG image file is transferred to the DRAM 106.

Next, the CPU 100 writes the JPEG image file stored in the DRAM 106 into the recording medium 102 via the memory control circuit 105, the system controller 104, and the interface circuit 103. Thus, the compressed image file is transferred to the recording medium 102.

If, in step S501, the imaging lens 107 is determined to be in a rotated state of 0°, i.e., a nonrotated state, the process proceeds to step S504.

In step S504, the predetermined quantization table is set in the compression/decompression circuit 118, and the image data stored in the DRAM 106 is supplied to the compression/decompression circuit 118. At the compression/decompression circuit 118, block coding is executed based on the set quantization table, so that a compressed JPEG image file is transferred to the DRAM 106.

Next, the CPU 100 writes the JPEG image file stored in the DRAM 106 into the recording medium 102 via the memory control circuit 105, the system controller 104, and the interface circuit 103. Thus, the compressed image file is transferred to the recording medium 102.

Accordingly, a rotated JPEG image file is recorded at a compression ratio lower than that of a nonrotated JPEG image file.

Furthermore, while, in the sixth embodiment, each processing is carried out by hardware, the processing can be carried out by software.

Seventh Embodiment

Figure 3:
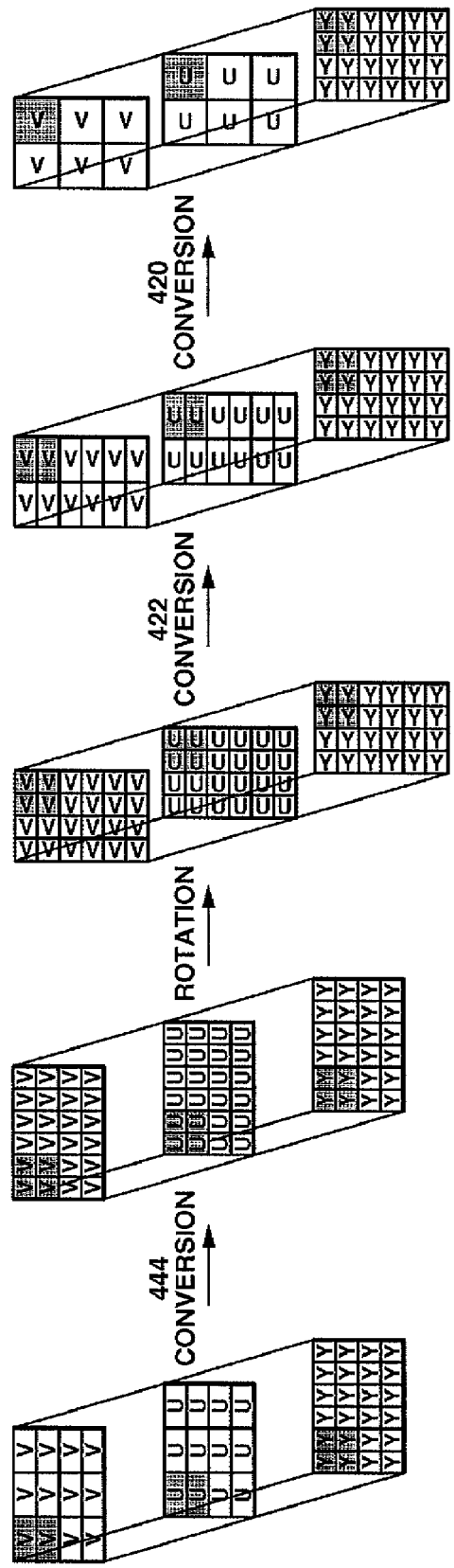
FIG. 3A is a diagram illustrating a relation of pixel data in a YUV422 data format.
FIG. 3B is a diagram illustrating a relation of pixel data converted into a YUV444 data format.
FIG. 3C is a diagram illustrating a relation of pixel data in the YUV444 data format obtained after image rotation.
FIG. 3D is a diagram illustrating a relation of pixel data converted into a YUV422 data format after image rotation.
FIG. 3E is a diagram illustrating a relation of pixel data converted into a YUV420 data format after image rotation.

Next, a seventh embodiment of the present invention will be described with reference to FIGS. 3 and 6.

A basic system configuration of an image forming method of the seventh embodiment is similar to that of the first embodiment shown in FIG. 1, and therefore the description of the seventh embodiment includes references to FIG. 1.

The image forming method of the seventh embodiment is applied to a digital camera which has the function of rotating and recompressing a reproduced image. The image forming method of the seventh embodiment will be described in detail.

A case of rotating JPEG compressed data of YUV422 data format will be described.

Steps S701 to S707 of FIG. 6 are similar to steps S1 to S7 of FIG. 2.

The process of FIG. 6 proceeds from step S701 through step S707, in which image data stored in the DRAM 106 having the number of pixels corresponding to the liquid crystal monitor 122 is supplied to the reproducing circuit 121. Thus, a reproduced image is displayed on the liquid crystal monitor 122.

In step S707, a rotated state of the image is determined. Since an initial state of the image is a rotation of 0°, i.e., a nonrotated state, the process proceeds to step S716.

In step S716, a state of the switch SROT is determined. If the switch SROT is determined to be turned on, the process proceeds to step S717.

In step S717, decompressed and restored image data stored in the DRAM 106 is read out, and the image rotated by 90° is transferred to the DRAM 106.

In step S718, the 90°-rotated image data stored in the DRAM 106 is supplied to the zoom circuit 120. At the zoom circuit 120, zooming is executed from a 90°-rotated image size of the original image to a size of the number of pixels corresponding to the liquid crystal monitor 122. Then, the image data having the number of pixels corresponding to the liquid crystal monitor 122 is transferred to the DRAM 106.

In step S719, the image data stored in the DRAM 106 having the number of pixels corresponding to the liquid crystal monitor 122 is supplied to the reproducing circuit 121. Thus, the reproduced image is displayed on the liquid crystal monitor 122.

Accordingly, a vertically long image rotated by 90° (not shown) is displayed on the liquid crystal monitor 122.

The case where, after the process proceeds from step S719 to S706, a user turns on the switch SREC to generate an instruction to record the rotated image will now be described.

In step S707, as the rotated state of the image is 90°, the process proceeds to step S708 so as to determine an image recording instruction.

In step S708, a state of the switch SROT is determined, as in step S716. If the switch SROT is determined to be turned on, the process proceeds to step S717 so as to rotate the image. If the switch SROT is determined to be in an off-state, the process proceeds to step S709. In this instance, as the switch SROT is in an off-state, the process proceeds to step S709.

In step S709, a state of the switch SREC is determined. If the switch SREC is determined to be turned on, the process proceeds to step S710 so as to record the rotated image. If the switch SREC is determined to be in an off-state, the process returns to step S706. In this instance, as the switch SREC is turned on, the process proceeds to step S710.

In step S710, an image of YUV422 data format shown in FIG. 3D is read out from the DRAM 106 and supplied to the YUV conversion circuit 124. At the YUV conversion circuit 124, the input image of YUV422 data format is converted into an image of YUV420 data format (each of color-difference signals U and V has one pixel with respect to four pixels of a luminance signal Y) shown in FIG. 3E. The image data of YUV420 data format is then transferred to the DRAM 106.

In step S711, a quantization table providing a lowest compression ratio is selected and set from among a plurality of quantization tables.

In step S712, the 90°-rotated image data of YUV420 data format stored in the DRAM 106 is supplied to the compression/decompression circuit 118. At the compression/decompression circuit 118, block coding is executed in the YUV420 format using the set quantization table. The compressed JPEG image data is transferred to the DRAM 106 and is then recorded on the recording medium 102.

As described above, according to the image forming method of the seventh embodiment, a rotated JPEG image data of YUV420 data format is recorded at a low compression ratio. Thus, in the case of recording a rotated image, a reduction in image quality which may result from rotation can be suppressed to a relatively low level.

Even after the conversion from YUV422 data (FIG. 3A) of the original image to YUV444 data (FIG. 3B), the amount of information contained in the image is maintained equal to that of the YUV422 data while the number of pixels increases. After the rotation, the image data is converted into YUV444 data (FIG. 3C). As a horizontal component and a vertical component of the image are switched by the rotation, the amount of information contained in the image corresponds to that of the YUV420 data. Next, when the YUV444 data is converted into YUV422 data by 422 conversion, while the image data is YUV422 data (FIG. 3D), the amount of informant contained in the YUV444 data before conversion corresponds to that of the YUV420 data because information of the horizontal component is suppressed by the conversion. Further, when the YUV422 data is converted into YUV420 data (FIG. 3E) by 420 conversion, as the amount of information originally contained in the YUV422 data corresponds to that of the YUV420 data, the amount of information after the conversion is maintained equal to that of the YUV420 data.

Thus, as long as the amount of information contained in the image is equal, it is possible to more reduce the amount of data after conversion in the case of compression coding in YUV420 data format than in the case of compressing coding in YUV422 data format. In the case of compression coding in YUV420 data format, overall compression efficiency can be increased more without deteriorating image quality.

In other words, in a system adaptable for YUV420 data format, if an image obtained by rotating an image of YUV422 data format is compressed in YUV420 data format before being recorded or transmitted, coding efficiency can be increased.

If image data is recorded in YUV420 data format, a higher compression ratio can be attained since the amount of image data is smaller than that of YUV422 data format.

Furthermore, as in the second embodiment, a quantization table providing a lower compression ratio can be selected from a quantization table used during decompression and a predetermined quantization table, and a processed image can be recorded at the lower compression ratio.

The image forming method of the seventh embodiment has been described taking as an example a case where the rotated image data is recorded responsive to the user's instruction. However, the image forming method can be similarly implemented in the case of transferring a JPEG file to a printer connected to a digital camera.

Furthermore, while, in the seventh embodiment, each processing is carried out by hardware, the processing can be carried out by software.

Other embodiments, in which various processing operations including rotation, trimming, and resizing are performed in combination, can be similarly implemented.

The above description has been made taking as an example a case where image data has YUV data format defined by a luminance signal Y and chrominance signals U and V. However, any data format defined by a luminance signal and chrominance signals can be similarly applicable.

Other Embodiments

The present invention can also be achieved by providing a storage medium storing program codes for performing the above described processes to an image capture system or apparatus, reading the program codes, by a CPU or MPU of the image capture system or apparatus, from the storage medium, then executing the program.

In this case, the program codes read from the storage medium realize the functions according to the above described embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and WAN (wide area network), can be used for providing the program codes.

Furthermore, in addition to realizing the functions according to the above embodiments by executing the program codes which are read by a CPU of the image capture system or apparatus, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the image capture system or apparatus or in a memory provided in a function expansion unit which is connected to the image capture system or apparatus, a CPU or the like contained in the function expansion card or unit performs a part or entire process in accordance with designations of the program codes and realizes functions of the above embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An image forming apparatus comprising:
   an image capture unit including a camera lens configured to capture an image of an object;
   a signal processing unit configured to process image data captured by the image capture unit;
   a rotation unit configured to rotate image data processed by the signal processing unit;
   at least two quantization tables;
   a quantization table selection unit configured to select one of the at least two quantization tables; and
   a compression unit configured to compress image data,
   wherein the at least two quantization tables includes a first quantization table providing a first compression ratio and a second quantization table providing a compression ratio higher than the first compression ratio,
   wherein the quantization table selection unit selects the second quantization table when the compression unit compresses image data processed by the signal processing unit, and selects the first quantization table when the compression unit compresses image data rotated by the rotation unit, and
   wherein the compression unit forms image data by compressing an image using the quantization table selected by the quantization table selection unit.

2. An image forming method comprising the following steps:
   an image capture step of capturing an image of an object via a camera lens;
   a signal processing step of processing image data captured by the image capture step;
   a rotation step of rotating image data processed by the signal processing step;
   a quantization table selection step of selecting one of at least two quantization tables; and
   a compression step of compressing image data,
   wherein the at least two quantization tables include a first quantization table providing a first compression ratio, and a second quantization table providing a compression ratio higher than the first compression ratio,
   wherein the quantization table selection step selects the second quantization table when image data processed in the signal processing step is compressed, and selects the first quantization table when image data rotated in the rotation step is compressed, and wherein the compression step compresses image data using the quantization table selected by the quantization table selection step.

3. A computer-readable storage medium storing computer-executable process steps for causing a computer to execute the image forming method of claim 2.

* * * * *